United States Patent [19]

Woods

[11] 3,775,750
[45] Nov. 27, 1973

[54] VEHICLE CONTROL SYSTEM, A METHOD OF AND APPARATUS FOR PROVIDING AN INTERLOCK CONTROL SIGNAL

[75] Inventor: David H. Woods, Marina Del Ray, Calif.

[73] Assignee: Westinghouse Electric Corporation, Pittsburgh, Pa.

[22] Filed: Mar. 17, 1972

[21] Appl. No.: 235,722

[52] U.S. Cl. .................. 340/171 R, 340/168 R
[51] Int. Cl. ............................................ H04q 9/00
[58] Field of Search ............... 340/171 R, 171 A, 340/168 R

[56] References Cited
UNITED STATES PATENTS

| | | | |
|---|---|---|---|
| 3,699,522 | 10/1972 | Haner, Jr. | 340/171 A X |
| 3,588,825 | 6/1971 | Shook | 340/167 B X |
| 3,562,712 | 2/1971 | Thorne-Booth et al. | 340/171 R X |

Primary Examiner—Donald J. Yusko
Attorney—F. H. Henson et al.

[57] ABSTRACT

A vehicle carrying a signal transmitter traverses a vehicle travel path. A plurality of stations are located at predetermined intervals along the travel path, and each such station includes interlock means. The vehicle transmits a plurality of coded command signals, including an interlock command signal. Decoding means decode the interlock command signal, and detector means provide an enable signal in response to the provision of any one of the coded command signals. An interlock control signal is provided for controlling the operation of the interlock means in response to the concurrent provision of a decoded interlock command signal and the enable signal.

3 Claims, 4 Drawing Figures

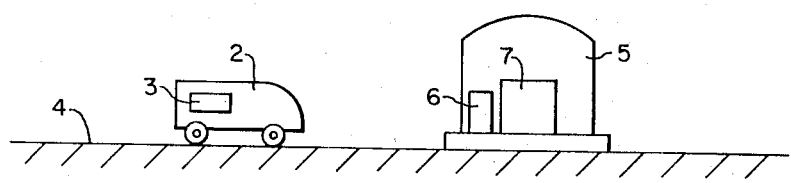
FIG. I.
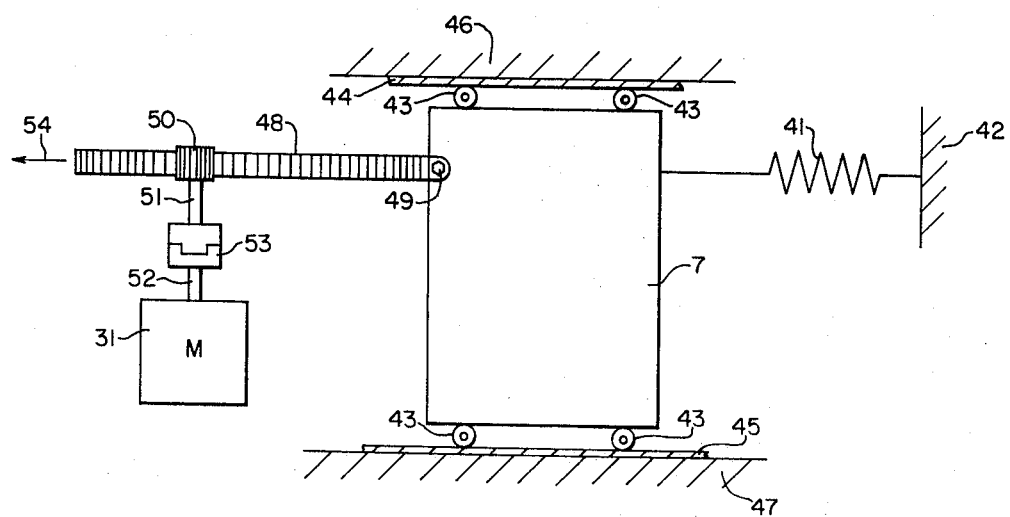
FIG. 4.

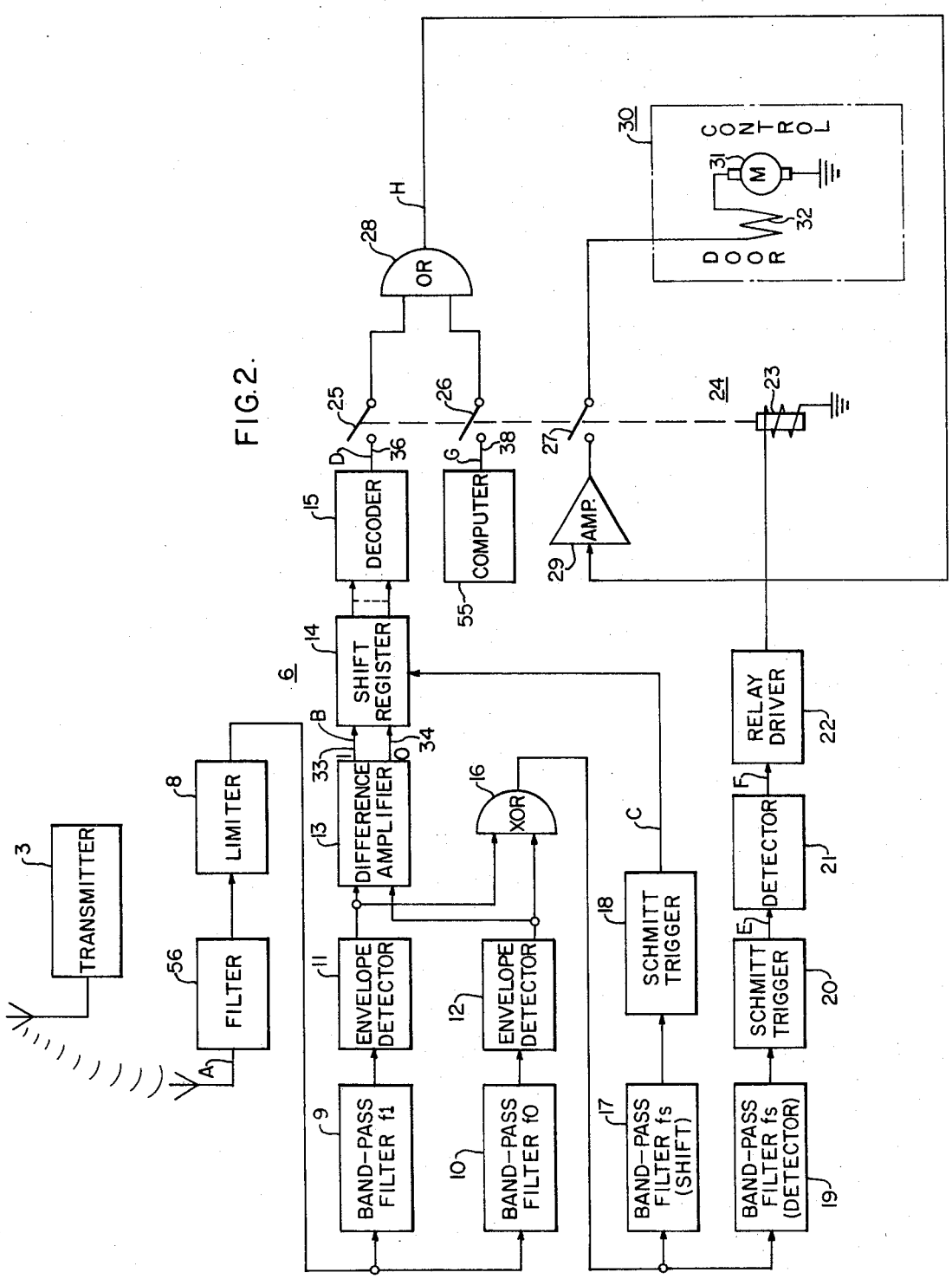

3,775,750

VEHICLE CONTROL SYSTEM, A METHOD OF AND APPARATUS FOR PROVIDING AN INTERLOCK CONTROL SIGNAL

CROSS REFERENCE TO RELATED APPLICATIONS

Reference is made to U.S. Pat. No. 3,551,889 entitled "REMOTE SIGNALING OF CONTROL SIGNALS," filed May 11, 1967 on behalf of C. S. Miller; U.S. Pat. No. 3,562,712 entitled "REMOTE TRANSMISSION OF CONTROL SIGNALS", filed May 11, 1967 on behalf of G. M. Thorne-Booth et al.; and U.S. Pat. application Ser. No. 164,894, filed July 21, 1971 on behalf of A. F. Harsh et al., which application is a continuation of now abandoned U.S. Pat. application Ser. No. 840,349, filed July 9, 1969 on behalf of A. F. Harsh et al. Each of the above-named issued U.S. patents, and the pending U.S. patent application is assigned to the assignee of the present invention.

BACKGROUND OF THE INVENTION

Coded signaling systems, for example, comma free code signaling systems are used for control and provision of specific functions needed in operational vehicle control systems. In such systems there is a requirement for fail safeness in operation of the system such that the safety of any passengers or cargo, present on any vehicle operational in the system, is at all times protected. To design an entire vehicle system in a fail-safe manner, that is making each component in the system fail-safe, is costly and in many instances unnecessary. In the present invention an interlock control signal is provided by a logic circuit in which only certain logic elements are made fail-safe. It is to be appreciated however that the logic elements which are made fail-safe insure the integrity of the complete logic circuit.

As is known in the art interlock control signals may be used for control operation interlocking purposes. Such control interlocking purposes may be for the unlocking or locking of track or signal switches, closing or opening of doors of a vehicle, or closing or opening of doors at a station, or the clearing of signals for cross-over tracks, or any of a number of other interlocking fucntions which are known in the art.

According to the teachings of the present invention a fail-safe interlocking logic control circuit is provided which includes fail-safe elements only in the critical sections of the logic circuit.

SUMMARY OF THE INVENTION

According to the teachings of the present invention an interlock control system is provided which includes means for providing a coded interlock command signal, and means for decoding the provided coded interlock command signal for producing a first control signal. Also included are means responsive to the provision of the coded interlock command signal for providing an enable signal. An interlock control signal is provided in response to the concurrent provision of the first control signal and the enable signal.

DESCRIPTION OF THE DRAWINGS

FIG. 1 is a pictorial representation of a vehicle situated on a vehicle travel path which includes a station having an interlock which is controlled by a coded signal transmission from a transmitter on board the vehicle;

FIG. 2 is a schematic and block diagram representation of an interlock control logic circuit embodying the teachings of the present invention;

FIG. 4 is a schematic representation of a controlled device, such as a station door, which may be controlled by the interlock control logic circuit of FIG. 2.

DESCRIPTION OF THE PREFERRED EMBODIMENT

Figure 3:
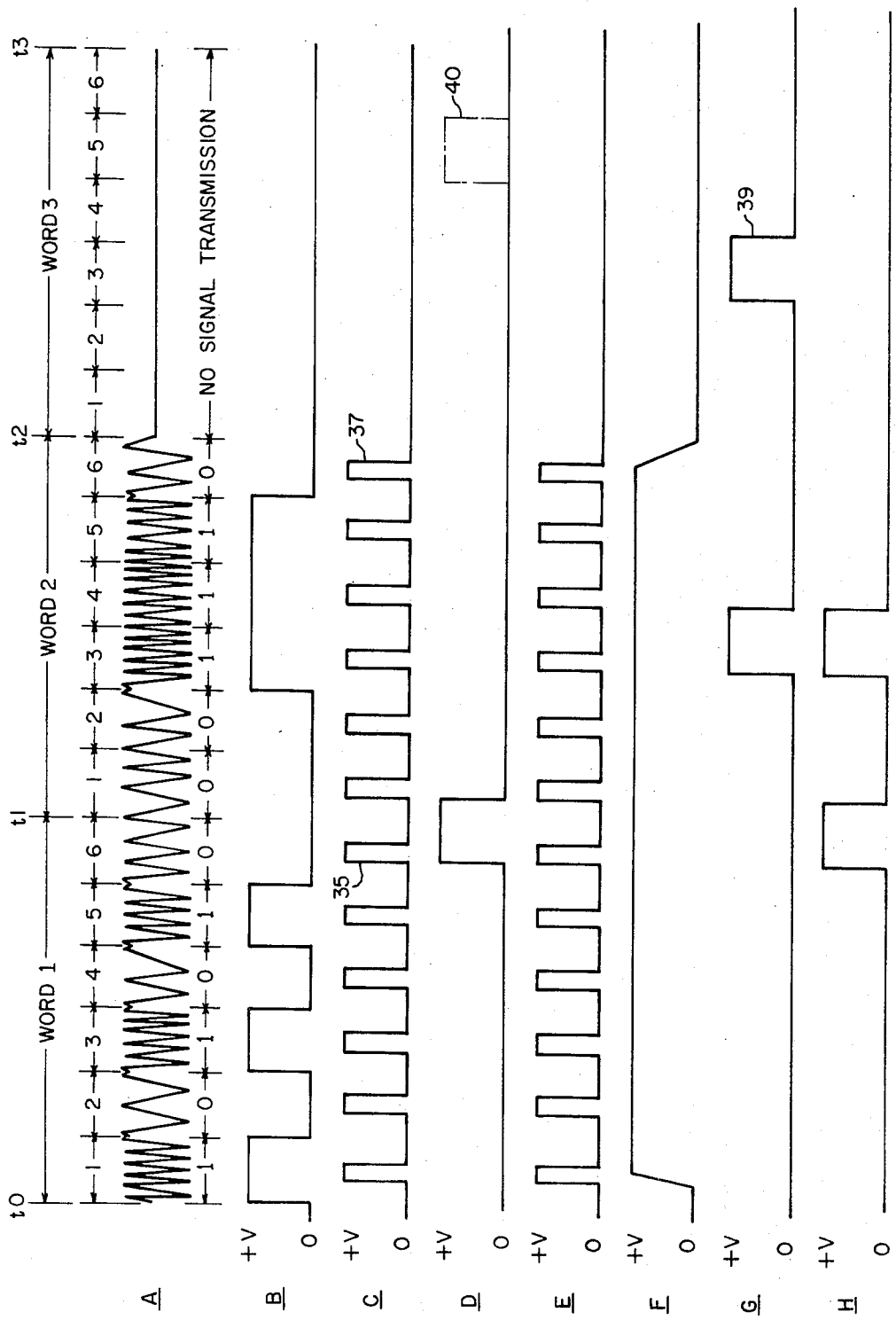
FIG. 3 is a wave-shape relationship diagram helpful in the understanding of the operation of the circuit of FIG. 2.

The present invention is directed towards a method and apparatus for providing an interlock control signal. A coded message is transmitted froma transmitter on board a vehicle, which message is in turn received at a remote receiving station located along a vehicle travel path. The transmitted coded message may include a plurality of command signals, one of which is an interlock command signal. The latter interlock command signal, for example, may be responded to by a logic circuit which provides a control signal used to control the opening of doors at the station. It is to be appreciated however that the present invention is not limited to providing a control signal only for the opening of doors at a station. As previously stated the interlock control signal may be used to control the unlocking of track or signal switches, closing or opening doors of tunnels, and providing clearing signals for cross-over tracks or any other well known interlocking functions used in vehicle control systems. The coded command signal transmission and receiving apparatus will be described as a comma free coded system as described in the previously referenced U.S. Pat. Nos. 3,551,889 and 3,562,712. It is to be appreciated however that the present invention may be practiced using any coded signal transmission system.

Refer now to FIG. 1 which is a pictorial representation of a vehicle 2 which houses a signal means such as a signal transmitter 3, which transmits a plurality of coded command signals. The latter vehicle travels along a vehicle travel path 4, along which, at predetermined locations, are located a plurality of stations. One such station 5 is illustrated. The station 5 includes an interlock control logic circuit 6 for providing interlock control signals in response to the reception of the transmitted coded command signals. The latter interlock control signals are used for controlling interlock devices such as a door 7.

Refer now to FIG. 2 which is a schematic and block diagram representation of the interlock control logic circuit 6 which is used to receive and decode the coded interlock command signal transmitted by the transmitter 3. The transmitter 3 repetitively and sequentially transmits a plurality of coded command signals, which include a coded interlock command signal, to the interlock control logic circuit 6. The transmitted coded message is comprised of a plurality of bits wherein a binary one signal is represented by a first frequency, for example a relatively high frequency, and a binary zero signal is represented by a second frequency, for example a relatively low frequency. The coded command signals are received by the interlock control logic circuit 6, and are initially passed through a filter circuit 56 to eliminate spurious and unwanted signal frequencies, and in turn are coupled to a limiting circuit 8 which limits the amplitude of the received signal to predetermined amplitude limits. The filtered and limited signal is then transmitted to the inputs of narrow band-pass filters 9 and 10 which have equal bandwidths, with the filter 9 having a center frequency $f1$ corresponding to the transmitted binary one bit signal and the other filter 10 having a center frequency $f0$ corresponding to the transmitted binary zero bit signal. The output signal from the filter 9, having a center frequency $f1$, is applied to an envelope detector circuit 11, and the output signal from the filter 10, having a center frequency $f0$, is applied to an envelope detector 12. The output signals from the respective envelope detectors 11 and 12 are applied to the respective inputs of a difference amplifier 13 which provides a one output signal on line 33 if the detected signal from the detector 11 tuned to $f1$ is greater in amplitude than the detected signal from the detector 12 tuned to the frequency $f0$, and provides a zero output signal on the line 34 is the reverse situation occurs. It is to be appreciated that a signal complementary to the one on line 33 is present on the line 34. Since the one or zero signal depends upon the relative amplitude of the applied input signals to the difference amplifier 13 and not on the actual value, a maximum likelihood of the correct signal detection is achieved. Since the difference amplifier 13 is symmetric in its operation, complemented logic levels are applied to the respective inputs of the shift register 14 and in turn complemented input signals are applied to a decoder 15 from the respective outputs of the stages of the shift register 14. The decoder 15 is a standard decoder known in the art, and which may be comprised of a plurality of gates connected to the shift register 14 such that the decoder 15 provides a binary one output signal only in the event the shift register 14 is storing the coded interlock command signal.

The outputs of the two envelope detectors 11 and 12 are also applied to an exclusive OR (XOR) circuit 16 which provides the bit rate synchronization pulse or shift pulse for the operation of the shift register 14, as well as providing a means for detecting the bit rate of the received coded message. The bit rate is detected to verify that a coded signal transmission is being received from the vehicle 2. This latter control function which is provided in response to the provision of the output signal from the XOR gate 16 will be described shortly. The synchronization or shift pulse is a signal having a period $ts$ in a frequency component fs regardless of the sequence of applied binary one and zero pulses to the interlock control logic circuit 6. That is, a shift pulse is provided for each received bit, regardless of the message content of the received command signal. The output signals from the exclusive OR circuit 16 are passed through a narrow band-pass filter 17 and from there to a Schmitt trigger circuit 18 which converts the sine wave at the output of the filter 17 to a substantially square wave suitable for driving the shift line of the shift register 14 at the desired bit rate in synchronization with the respective binary one or binary zero output signals from the difference amplifier 13. The signal delay provided by the band-pass filter 17 and Schmitt trigger circuit 18 is adjusted such that the respective binary input signals are properly entered into the shift register 14 at the end of each respective signaling interval $ts$ when the difference in the envelope detector outputs is maximum. Since this shift control pulse is derived from the received coded command signal, no additional synchronization information is needed.

The output signals from the exclusive OR circuit 16 are also passed through a narrow band-pass filter 19 similar to filter 17 and from there to a Schmitt trigger circuit 20 which converts the sine wave at the filter output to a substantially square wave suitable for detection by a detector 21. The detector 21 provides a DC signal at its output so long as the Schmitt trigger circuit 20 is providing pulses at a predetermined rate to the input of the detector 21. The detector 21 controls a relay driver device 22 which, when receiving an input from the detector 21, provides current at its output for energizing the coil 23 of a fail-safe relay 24. The devices 19, 20 and 21 form a bit rate detector for verifying that any one of the plurality of transmitted coded command signals is presently being received. In response to the detection of any one of the coded command signals an enable signal is provided at the output of the device 21 for enabling the relay driver 22 to energize the relay 24. It is to be appreciated that any other suitable bit rate detector may be used in the practice of the present invention. Whenever the relay 24 is energized by the signal output from the relay driver 22, the contacts 25, 26 and 27 of the relay 24 are closed. When the contacts 25 and 26 are closed signal paths from the output of the decoder 15 and the output of a computer 55 are provided to the respective inputs of a gate network such as the OR circuit 28. The output of the OR gate 28 is connected to the input of an amplifier 29 which is connected through the contact 27 of the relay 24 to the input interlock means, such as the door control device 30. The door control device 30, for example, includes a motor 31 having a field winding 32. As will be described shortly an interlock control signal is provided to the input of the door control device 30 only in the event that a signal transmission is received from the transmitter 3 as manifested by the relay driver 22 being enabled for providing current to the coil 23 of the relay 24, thereby closing the contacts 25, 26 and 27. If concurrent therewith the decoder 15 is providing a first control signal such as a decoded interlock command signal to the first input of the OR GATE 28, or the computer 55 is providing a second interlock command signal to the second input of the OR gate 28, an output signal from the OR gate 28 is provided to the input of the amplifier 29. The amplifier 29 then supplies current through the closed contact 27 to the motor 31 in the door control device 30 for controlling same.

Consider now the detailed operation of the interlock control logic circuit 6. The letters A through H found on FIG. 2 are the circuit points at which the waveshapes A through H, respectively, of FIG. 3 are manifested in the circuit of FIG. 2. In the description to follow the convention is adopted that a relatively positive voltage for example +V volts is indicative of a binary one signal level, and a relatively negative voltage for example zero volts is indicative of a binary zero signal level. The operation of the logic circuit illustrated in FIG. 2 will be described for three conditions of system operation, namely, condition 1 - wherein the vehicle is transmitting an interlock command signal to the logic circuit 6 such that an interlock control signal may be provided by the circuit; condition 2 - wherein the vehicle is transmitting one of the plurality of coded command signals other than decoded interlock command signal, and the computer 55 is transmitting an interlock command signal such that an interlock control signal may be provided and; condition 3 - wherein the vehicle is transmitting no coded command signal to the logic circuit 6 such that no interlock control signal is provided. Waveshape A of FIG. 3 is illustrative of the comma free code binary word transmitted by the tansmitter 3, and which is received at the input to the filter 7. Each word in the signal transmission is arbitrarily chosen to be six bits in length. Three word times are illustrated, namely word 1 time, word 2 time and word 3 time. Word 1 is transmitted during the time interval $t0$ to $t1$ and has a binary content of 101010. Word 1 will be termed the coded interlock command signal. Word 2 which occurs in the time interval $t1$ to $t2$ has a binary content of 001110 and will be termed any one of the plurality of coded command signals other than the coded interlock command signal transmitted by the transmitter 3. It is to be appreciated that word 2 may have any binary content other than that illustrated for word 1. During word 3 time which occurs in the time interval from $t2$ to $t3$ there is no signal transmission from the transmitter 3.

Consider now the operation of the logic circuit 6 during word 1 time. The bits 1 through 6 of word 1 are received by the filter 56, passed through the limiter 8 and applied to the respective inputs of the filters 9 and 10. Bits 1, 3 and 5 are passed by the filter 9 and bits 2, 4 and 6 are passed by the filter 10. The binary one signals appearing at the output of filter 9 are detected by the detector 11 and the binary zero signals appearing at the output of filter 10 are detected by the detector 12, and these latter signal are then applied to the respective inputs of the difference amplifier 13. In response to the binary one input signals applied to the difference amplifier 13 from the detector 11 a binary word is provided on the output line 33 to the input of the shift register 14 (see waveshape B of FIG. 3). It is to be appreciated that the waveshape present on the line 34 is complementary to the waveshape B of FIG. 3. During word 1 time the exclusive OR gate 16 is also receiving respective input signals from the detectors 11 and 12, and in response thereto provides signal inputs to the filters 17 and 19. The filter 17 passes signals for bit times 1 through 6 to the input of the Schmitt trigger circuit 18 which responds thereto to provide six binary pulses at its output corresponding essentially to the bit times 1 through 6 of word 1 (see waveshape C of FIG. 3). These latter shift pulses are used to shift the binary signals through the shift register 14. At bit time 6 the sixth shift pulse 35 (see waveshape C of FIG. 3) occurs and word 1 is stored in the shift register 14. In response to the storage of word 1 the decoder 15 senses the storage of the coded interlock command signal and provides a first control signal at its output 36 (see waveshape D of FIG. 3).

Consider now the system operation required for energizing the control means relay 24 so that contacts 25, 26 and 27 are closed whereby an interlock control signal may be provided. As was previously stated, the exclusive OR circuit 16 is providing binary signal indications to the input of the detector 19 during each bit time of word 1, which is indicative of any one of the plurality of coded command signals being received. The filter 19 passes the latter signals to the input of the Schmitt trigger circuit 20. Binary one pulses (see waveshape E of FIG. 3), which occur substantially at the same time as the shift pulses at the output of the Schmitt trigger circuit 18 (see wave-shape C of FIG. 3), are provided at the output of the trigger circuit 20. In response to the trigger pulses from the Schmitt trigger circuit 20 occurring at a predetermined rate the detector 21 is operative to provide a direct current (DC) enable signal to the input of a relay driver 22 (see waveshape F of FIG. 3), which responds to the latter signal to provide sufficient current to the coil 23 of the relay 24 to energize same. In response thereto the contacts 25, 26 and 27 are closed and the first control signal (see wavehspe D of FIG. 3) is provided to the first input of the OR gate 28 from the decoder 15. In response thereto the OR gate 28 provides a binary one signal pulse at its output (see waveshape H of FIG. 3). This pulse which is a second control signal is then applied to the input of an amplifier 29 which is designed to respond to the latter pulse to provide sufficient current to drive the motor 31 in the interlock means 30. This latter current is passed through the closed contacts 27, the field coil 32, and the motor 31 begins to turn. The interlock means 30 therefore functions, for example, to open the door 7 of the station 5 such that passengers may embark and disembark from the vehicle 2.

Consider now the operation of the circuit 6 during word 2 time, that is a time when one of the plurality of coded command signals other than the coded interlock command signal is provided. The binary content of the word 2 is 001110 which is clearly different than the binary content of the coded interlock command signal provided during word 1 time. From time $t1$ through $t2$ the bits 1 through 6 respectively of word 2 are received at the input to the filter 56 and passed through the limiter 18, to the inputs of the filters 9 and 10. The respective binary one and zero signals are passed through the filters 9 and envelope detector 11, and filter 10 and envelope detector 12 to the respective inputs of the difference amplifier 13, and in response thereto a binary word appears on the line 33 (see waveshape B of FIG. 3). The exclusive OR circuit 16 provides input signals during the latter time interval to the filter 17 which in turn provides input signals to the Schmitt trigger circuit 18 which then provides shift pulses to the shift register 14 (see waveshape C of FIG. 3). At bit time 6 of word 2 the shift pulse 37 (see waveshape C of FIG. 3) shifts the sixth bit in word 2 into the shift register 14. The decoder 15 provides no output signal on the line 36 at this time, since the coded interlock command signal is not stored. The computer 55, however, is providing a second interlock command signal on the line 38 at this time. A computer such as the computer 55 may be part of a computer controlled vehicle system as described in the previously referenced patent application Ser. No. 164,894. The computer 55 would have stored therein a program indicative of the times at which certain vehicles are programmed to arrive at selected stations along the vehicle travel path. Therefore, whenever a vehicle is to be at a particular station the computer would transmit an interlock command signal. In the event the vehicle is transmitting a command signal other than the interlock command singal the interlock control signal would be generated to open the station doors as long as the vehicle is transmitting one of the other coded command signals, as is the case now. Since the transmitter 3 is transmitting one of the plurality of coded command signals other than the interlock command signal at this time the exclusive OR gate 16 is providing the respective binary one zero signal indications to the filter circuit 19, and in turn to the Schmitt trigger circuit 20 for detection by the detector 21. Therefore, for the bit times 1 through 6 of word 2 an enable signal is applied to the input of the relay driver 22, as was previously described for word 1 time, and in response thereto the relay driver 22 provides current to the coil 23 energizing the relay 24 such that the computer 55 applies the second interlock command signal to the second input of the OR gate 28 through the closed contact 26. The gate 28 in turn provides a second control signal to the input of the amplifier 29 which then applies current through the closed contact 27 to the motor 31 for energizing same as was explained for word 1 time.

Consider now the operation of the circuit 6 for condition 3 when there is no signal transmission from the transmitter 3 and the first instance when the computer 55 is transmitting a second interlock command signal, and a second instance when the decoder 15 provides an incorrect first control signal at its output. Since there is no signal transmission received it is clear that there is no signal output from the shift register 14, and therefore in the first instance the decoder 15 is unable to provide at its output a first control signal (see waveshape D of FIG. 2). Likewise the relay driver 22 receives no input signal (see waveshape F of FIG. 3) and the relay 24 remains deenergized. Even if the computer 55 is providing a second interlock command signal at this time as illustrated by the pulse 39 (see wavehsape G of FIG. 3) it has no effect on the circuit operation since the relay 24 is deenergized and the contact 26 is open. Therefore no second control signal is provided at the output of the OR gate 28 (see waveshape H of FIG. 3) and the amplifier 29 in turn provides no output current. Even if there is some circuit malfunctions such that the amplifier 29 were providing output current it would not be provided to the motor 31 since the contacts 27 of the relay 24 are open at this time. Therefore no interlock control signal is provided. Consider now the previously mentioned second instance of operation, that is the decoder 15 provides a first control signal at its output as indicated by the pulse in phantom 40 (see waveshape D of FIG. 3). This is to depict some circuit failure whereby the decoder 15 provides an output first control signal. It is clear that has no effect on the circuit operation since the relay 24 remains deenergized and the contact 25 remains open such there is no second control signal provided at the output of the OR gate 28 (see waveshape H of FIG. 3) and no interlock control signal is provided as was previously explained.

FIG. 4 illustrates one of many interlocking means which may be controlled by the previously described interlock control signal. In this particular instance the interlock means is the door 7 at the station 5. In response to the provision of the interlock control signal the motor 31 is driven and the door 7 opens. In response to the interlock signal no longer being provided the motor 31 is no longer driven and door 7 returns to a closed position The door 7 is biased closed by a spring 41 which is secured to the chassis of the station 5 as illustrated by the symbol 42. The door 7 is slidably mounted to the station 5 by the wheels 43 which roll on members 44 and 45 which are secured to the station 5 as indicated by the symbols 46 and 47 respectively. The door 7 is attached to a rack 48 by suitable means such as a bolt 49. The rack 48 engages a pinion gear 50 which is mounted to a drive member 51 which is attached to the drive member 52 of the motor 31 by means of a clutch 53. The motor 31 responds to an interlock control signal to drive the rack 48 in a direction as illustrated by the arrow 54. The torque on the drive member 52 is sufficient to overcome the bias on the springs 41 and the clutch 53 begins to slip once the door 7 is open. This is the case as long as the motor 31 continues to drive. In the event the interlock control signal is no longer provided the motor 31 no longer drives and the bias of the springs 41 is sufficient to return the door 7 to its closed position. It is to be appreciated that the interlockings controlled by the interlock control signal may be other than a door as illustrated.

In summary an interlock control system has been disclosed which includes means for providing a plurality of coded command signals, including a coded interlock command signal. There are also included means responsive to the provision of the coded interlock command signal for decoding same to provide a first control signal. There are also means responsive to the provision of any one of the plurality of coded command signals for providng an enable signal. An interlock control signal is then provided for controlling an interlock means in response to the concurrent provision of the first control signal and the enable signal.

I claim as my invention:

1. In a vehicle control system wherein at least one vehicle travels between stations located along a vehicle travel path, the combination comprising:
   signal means on board said one vehicle for providing a plurality of coded command signals including a coded first interlock command signal;
   interlock means;
   decoder means responsive to the provision of said coded first interlock command signal for providng a decoded first interlock command signal;
   means for providing a second interlock command signal;
   means responsive to the provision of either one of said decoded first interlock command signal or said second interlock command signal for providing a first control signal;
   detector means responsive to the provision of any one of said plurality of coded command signals for providing an enable signal; and
   control means responsive to the concurrent provision of said first control signal and said enable signal for providing an interlock control signal for controlling the operation of said interlock means.

2. The combination claimed in claim 1 wherein said interlock now comprises the doors at a given station.

3. In an interlock control system a method of providing an interlock control signal, said method comprising the steps of:
   providing a plurality of coded command signals including a coded first interlock command signal;
   decoding said coded first interlock command signal;
   providing a second interlock command signal;
   providing a first control signal in response to the provision of either one of the decoded first interlock command signal or the second interlock command signal;
   providing an enable signal in response to the provision of any one of said plurality of coded command signals; and
   providing said interlock control signal in response to the provision of said first control signal and said enable signal.

* * * * *